(12) United States Patent
Muise et al.

(10) Patent No.: US 7,247,216 B2
(45) Date of Patent: Jul. 24, 2007

(54) PROCESS FOR ENCAPSULATION OF CELLULOSE BASED SUBSTRATE USING NON-ELECTROMAGNETIC HEATING

(75) Inventors: Herbert D. Muise, deceased, late of Tumwater, WA (US); by H. Donald Muise, Jr., legal representative, Tumwater, WA (US); Brian C. Horsfield, Federal Way, WA (US); Gerald Wilhite, Bowling Green, KY (US)

(73) Assignee: Weyerhaeuser Co., Federal Way, WA (US)

( * ) Notice: Subject to any disclaimer, the term of this patent is extended or adjusted under 35 U.S.C. 154(b) by 369 days.

(21) Appl. No.: 10/880,018

(22) Filed: Jun. 29, 2004

(65) Prior Publication Data

US 2005/0284565 A1    Dec. 29, 2005

(51) Int. Cl.
*B29C 65/00* (2006.01)
*B32B 37/00* (2006.01)

(52) U.S. Cl. .................... 156/267; 156/272.8; 156/285
(58) Field of Classification Search ................ 156/286, 156/250, 267, 285, 272.8
See application file for complete search history.

(56) References Cited

U.S. PATENT DOCUMENTS

| | | | |
|---|---|---|---|
| 3,790,399 A * | 2/1974 | Frappier et al. | 427/285 |
| 3,929,536 A * | 12/1975 | Maughan | 156/85 |
| 4,087,300 A | 5/1978 | Adler | |
| 4,540,392 A | 9/1985 | Junod et al. | |
| 4,722,474 A | 2/1988 | Dropsy | |
| 4,749,430 A | 6/1988 | Samuelson et al. | |
| 4,806,398 A | 2/1989 | Martin, Jr. | |
| 4,871,406 A | 10/1989 | Griffith | |
| 5,009,308 A | 4/1991 | Cullen et al. | |
| 5,108,355 A | 4/1992 | Walsh | |
| 5,133,999 A | 7/1992 | Löfgren et al. | |
| 5,143,660 A * | 9/1992 | Hamilton et al. | 264/1.37 |
| 5,145,549 A | 9/1992 | Mosburger | |
| 5,176,251 A | 1/1993 | Davis et al. | |
| 5,240,111 A | 8/1993 | Yamashita et al. | |
| 5,316,609 A | 5/1994 | Guither et al. | |

(Continued)

FOREIGN PATENT DOCUMENTS

| | | |
|---|---|---|
| WO | WO 90/09927 A1 | 9/1990 |
| WO | WO 94/02364 A1 | 2/1994 |

OTHER PUBLICATIONS

Coles, Richard et al., Food Packaging Technology, 2003, Blackwell Publishing Ltd., pp. 193 and 256.*
Petrie, Edward, Handbook of Adhesives and Sealants, 2000, mcGraw-Hill, p. 24.*

*Primary Examiner*—Richard Crispino
*Assistant Examiner*—Emily Chimiak
(74) *Attorney, Agent, or Firm*—Christensen O'Connor Johnson Kindness (57) ABSTRACT

A method for encapsulating a cellulose based substrate with polymeric films involves heating the respective films using a non-electrogmagnetic radiation heating source and providing a pressure differential between an environment defined between the films and an environment external to the films so that conformance of the film to the cellulose based substrate is promoted. The cellulose based substrate is entirely encapsulated by the films and the films are sealed around the peripheral edges of the container as well as edges that are defined adjacent slots and cutouts.

14 Claims, 10 Drawing Sheets

U.S. PATENT DOCUMENTS

| | | |
|---|---|---|
| 5,575,418 A | 11/1996 | Wu et al. |
| 5,609,293 A | 3/1997 | Wu et al. |
| 5,632,404 A | 5/1997 | Walsh |
| 5,651,851 A | 7/1997 | Gatcomb |
| 5,665,408 A * | 9/1997 | Coupe et al. ............... 426/113 |
| 5,690,775 A | 11/1997 | Calvert et al. |
| 5,725,917 A | 3/1998 | Parks |
| 5,746,871 A | 5/1998 | Walsh |
| 5,783,030 A | 7/1998 | Walsh |
| 5,792,301 A | 8/1998 | Calvert et al. |
| 5,794,812 A | 8/1998 | Walsh |
| 5,968,636 A | 10/1999 | Sinclair et al. |
| 5,988,494 A | 11/1999 | Fontaine |
| 6,083,580 A * | 7/2000 | Finestone et al. .......... 428/34.2 |
| 6,113,981 A | 9/2000 | Ogilvie, Jr. et al. |
| 6,221,192 B1 | 4/2001 | Walsh |
| 6,332,488 B1 | 12/2001 | Walsh |
| 6,338,234 B1 * | 1/2002 | Muise et al. .................. 53/411 |
| 6,352,096 B1 | 3/2002 | Walsh |
| 6,358,558 B1 | 3/2002 | Viitanen |
| 6,632,163 B2 | 10/2003 | Zumbiel |
| 2001/0022211 A1 | 9/2001 | Walsh |
| 2002/0000297 A1 | 1/2002 | Kitano et al. |

\* cited by examiner

PROCESS FOR ENCAPSULATION OF CELLULOSE BASED SUBSTRATE USING NON-ELECTROMAGNETIC HEATING

FIELD OF THE INVENTION

The present invention relates to a method for encapsulating a cellulose based substrate with a polymeric film and products formed thereby.

BACKGROUND OF THE INVENTION

Containers made from fibreboard are used widely in many industries. For example, fibreboard containers are used to ship products that are moist or packed in ice such as fresh produce or fresh seafood. It is known that when such containers take up moisture, they lose strength. To minimize or avoid this loss of strength, moisture-resistant shipping containers are required.

Moisture-resistant containers used to date have commonly been prepared by saturating container blanks with melted wax after folding and assembly. Wax-saturated containers cannot be effectively recycled and must generally be disposed of in a landfill. In addition, wax adds a significant amount of weight to the container blank, e.g., the wax can add up to 40% by weight to the container blank.

Other methods for imparting moisture resistance to container blanks have included impregnation with a water-resistant synthetic resin or coating the blank with a thermoplastic material. In the latter case, forming water-resistant seals around container blank peripheral edges and edges associated with slots or cutouts in the container blank has been an issue. When seals along these edges are not moisture resistant or fail, moisture can be absorbed by the container blank with an attendant loss of strength. In addition, obtaining consistent and reproducible bonding of the thermoplastic material to the container blank and around edges has been a challenge.

Faced with the foregoing, the present inventors have worked to develop a method for producing a container blank encapsulated with a polymeric film that is recyclable and lighter in weight than previous wax-saturated containers and does not suffer from inconsistent bonding, sealing, and conformance of a film to the substrate.

SUMMARY OF THE INVENTION

Fresh produce growers, distributors of fresh produce and fresh produce retailers will find the encapsulated cellulose based substrates in the form of container blanks of the present invention desirable for a number of reasons, including their recyclable nature and lighter weight compared to conventional wax-saturated blanks. The lighter weight will translate into reduced shipping costs. Manufacturers of container blanks will find the methods of the present invention desirable because the methods provide an effective way to reproducibly manufacture encapsulated container blanks without the need to use wax, which inhibits recycling of the container. Furthermore, the clarity of graphics associated with container blanks formed in accordance with the methods of the present invention are superior to the clarity of graphics associated with wax-saturated container blanks.

In one aspect, the present invention is directed to a method for encapsulating a cellulose based substrate, one example of which is a container blank, with a polymeric film. In accordance with this aspect of the present invention, a cellulose based substrate having a first surface, a second surface opposite the first surface, and a cellulose based substrate periphery is provided. A first polymeric film is provided adjacent the first surface. This first polymeric film extends beyond the cellulose based substrate periphery. Adjacent the second surface of the cellulose based substrate is provided a second polymeric film which also extends beyond the cellulose based substrate periphery. The temperature of the first polymeric film adjacent the first surface and the second polymeric film adjacent the second surface is increased using a non-electromagnetic radiation heating source. The heated first film and the heated second film cooperate to define an envelope that substantially encapsulates the cellulose based substrate. In order to promote the conformance of the polymeric films to the cellulose based substrate, a pressure differential is provided between an environment within the envelope defined by the first and second film and an environment outside such envelope. This pressure differential promotes the conformance of the first polymeric film and second polymeric film to the cellulose based substrate, particularly its peripheral edges, and edges defining any cutouts or slots provided therein. The first and second film adjacent the cellulose based substrate periphery and any edges defining slots and cutouts are bonded to each other in order to provide a moisture-resistant seal around the exposed edges.

In accordance with the present invention, the pressure differential can be provided a number of different ways, including generating steam within the envelope and then allowing the steam to condense. The condensing steam reduces the pressure within the envelope to below atmospheric pressure, thus creating a pressure differential between the interior of the envelope and its exterior. In accordance with the present invention, excess polymeric film can be trimmed from around the peripheral edges of the cellulose based substrate as well as within any slots or cutouts that are provided in the cellulose based substrate. A vacuum chamber may also be used to provide the pressure differential.

Polymeric film encapsulated cellulose based substrate formed in accordance with the present invention can be folded and secured to form containers suitable for containing moist materials such as fresh produce. After use, the containers can be recycled and the polymeric film separated from the cellulose based substrate.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

As used herein, the following terms have the following meanings.

Fibreboard refers to fabricated paperboard used in container manufacture, including corrugated fibreboard.

Container refers to a box, receptacle, or carton that is used in packing, storing, and shipping goods.

Moisture-resistant film refers to polymeric films that are substantially impervious to moisture. Such films are not necessarily totally impervious to moisture, although this is preferred, but the amount of moisture capable of passing through a moisture-resistant film should not be so great that such moisture reduces the strength or other properties of the cellulose based substrate to below acceptable levels.

Panel refers to a face or side of a container.

Score refers to an impression or crease in a cellulose based substrate to locate and facilitate folding.

Thermobondable refers to a property of a material that allows the material to be bonded to a surface by heating the material.

Thermoplastic refers to a material, usually polymeric in nature, that softens when heated and returns to its original condition when cooled.

Flaps refer to closing members of a container.

The present invention provides for the encapsulation of a cellulose based substrate with polymeric films. Cellulose based substrates are formed from cellulose materials such as wood pulp, straw, cotton, bagasse and the like. Cellulose based substrates useful in the present invention come in many forms such as fibreboard, containerboard, corrugated containerboard and paperboard. The cellulose based substrates can be formed into structures such as container blanks, tie sheets, slipsheets and inner packings for containers. Examples of inner packings include shells, tubes, U-boards, H-dividers and corner boards. The following discussion proceeds with reference to an exemplary cellulosic based substrate in the form of a containerboard blank, but it should be understood that the present invention is not limited to containerboard blanks.

Figure 1:
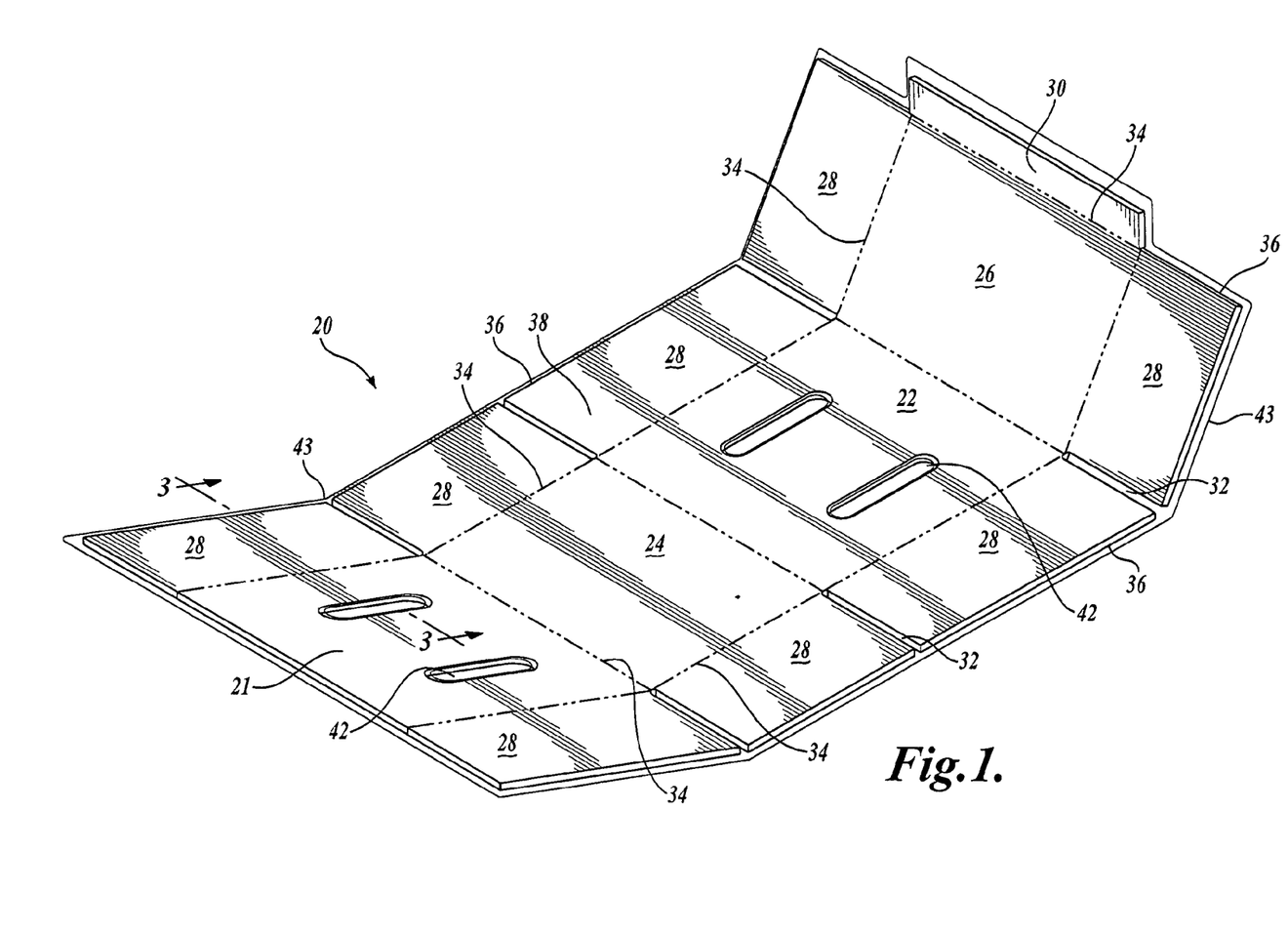
FIG. 1 is a perspective view of one surface of a container blank encapsulated with a polymeric film by a method carried out in accordance with the present invention.

Referring to FIG. 1, a non-limiting example of a cellulose based substrate includes a container blank 20 having rectangular panels 21 and 22 that will form sidewalls of a container when the blank is folded and secured. Panels 21 and 22 are separated by rectangular panel 24 that will form an end wall of a container when the blank is folded. Extending from the edge of panel 22 opposite the edge connected to panel 24 is an additional rectangular panel 26 that will form a second end wall. The sequence of panels 21, 22, 24, and 26 define a lengthwise dimension for container blank 20. Each panel 21, 22, 24, and 26 includes two rectangular flaps 28 extending from the left edge and right edge thereof. Extending rearwardly from the rear edge of panel 26 is a narrow rectangular flap 30. Panels 21, 22, 24, and 26 and flaps 28 and 30 are separated from each other by either slots 32 defined as cuts formed in container blank 20 or scores 34. The external peripheral edge around container blank 20 defines a container blank periphery 36. As illustrated, container blank 20 has a first surface defined in FIG. 1 as the upper visible surface and a second opposite surface forming the underside of the container blank in FIG. 1. Panel 21 and panel 22 include cutouts 42 that serve as ventilation orifices, handles, or drainage orifices once container blank 20 is formed into a container by applying adhesive to panel 30 and positioning panel 30 adjacent to panel 21. While containers blank 20 is illustrated with scores, cutouts and slots, it is understood that such features are not required and that a cellulose based substrate without such features may be encapsulated with polymeric films in accordance with the present invention. In the illustrated embodiment, the edge of the blank adjacent the container blank periphery and the blank edges that define the slots and cutouts are examples of exposed edges adjacent to which the polymeric films are sealed to each other as described below in more detail.

Overlying and underlying container blank 20 is polymeric film 43 sealed around the container blank periphery 36. Polymeric film 43 is also sealed adjacent the exposed blank edges that define slots 32 and cutouts 42. As used herein, the term "sealed" means that overlapping portions of the film adjacent the top surface and the film adjacent the bottom surface are connected to each other in a manner that substantially prevents moisture from passing through the seal.

Figure 2:
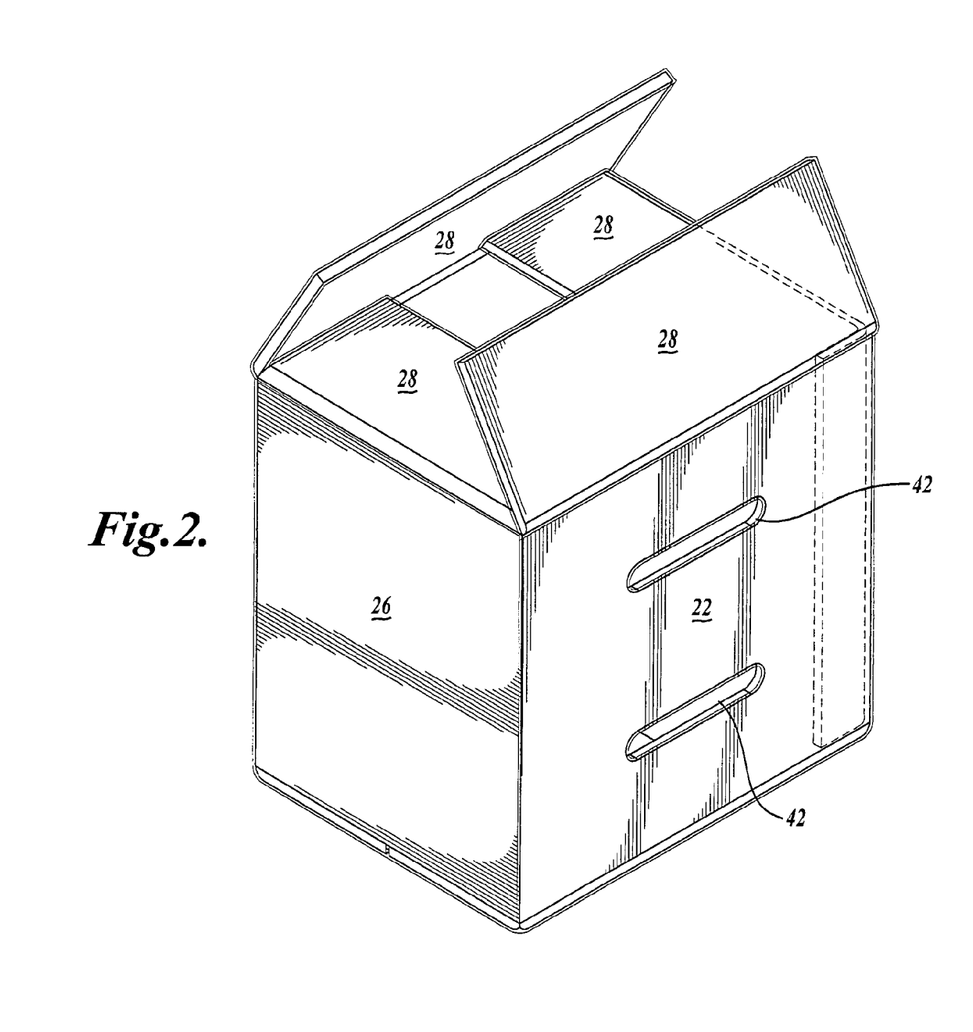
FIG. 2 is a perspective view of a container formed from the container blank of FIG. 1.

The container blank 20 can be folded and secured to form a container as illustrated in FIG. 2. The numbering convention of FIG. 1 has been carried forward in FIG. 2. Prior to folding container blank 20 into a container, polymeric films 43 within slots 32 are cut. Additionally prior to folding the container, the excess polymeric film adjacent to the periphery 36 can be trimmed. Furthermore, the polymeric film spanning cutouts 42 can be cut in such a manner that a passageway is made into the interior of the container while at the same time preserving the film-to-film seal.

Figure 3:
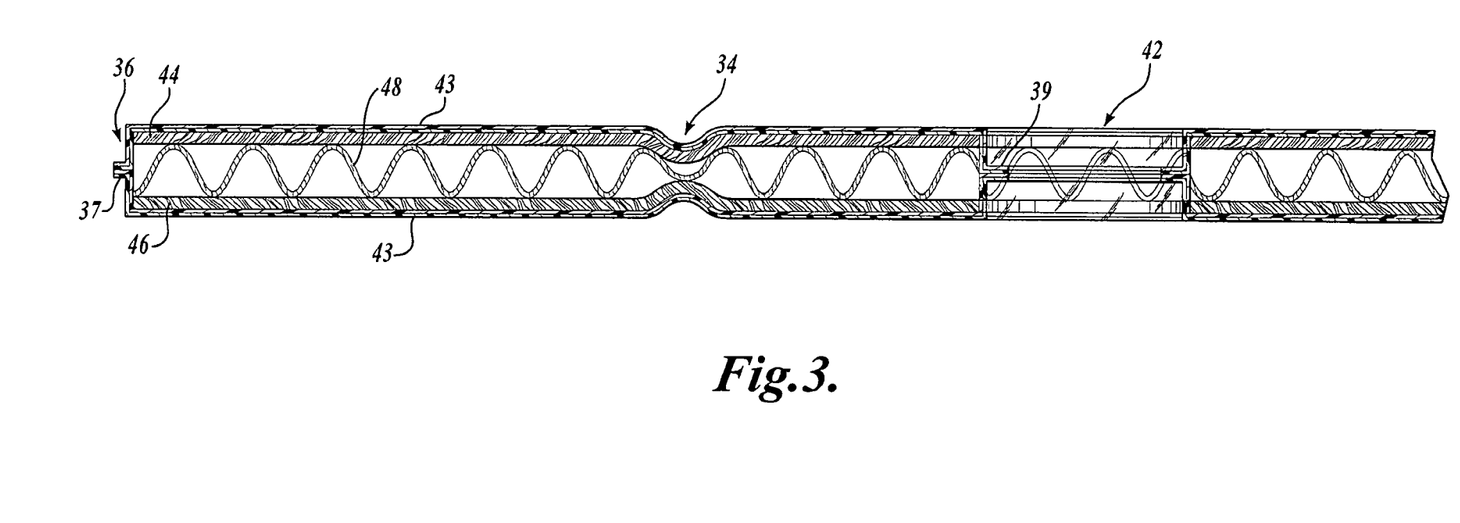
FIG. 3 is a section taken through line 3-3 of FIG. 1.

Referring to FIG. 3, container blank 20 is comprised of upper liner board 44 and lower liner board 46 spaced apart by flutes 48. An outer surface of liner board 44 is overlaid with polymeric film 43. An outer surface of lower liner board 46 is overlaid with a polymeric film 43. As illustrated in FIG. 3, polymeric films 43 may comprise two layers of material. Details regarding the films are described below in more detail. The applied polymeric films 43 conform to the topographical features defined by the peripheral edge, scores 34 and cutouts 42. The films conform to the topographical features by following the elevational changes in the first and second surfaces of the container blank. Preferably, films 43 conform to the shape and encapsulate the exposed edges of the container blank such as those defining slots and cutouts, and seal closely against such edges as depicted in FIG. 3. Likewise, polymeric films 43 adjacent the container blank periphery 36 are sealed at 37 to provide a moisture-resistant seal. A similar moisture-resistant seal 39 is provided between the polymeric films 43 within cutout 42.

Containerboards are one example of cellulose based substrates useful in the present invention. Particular examples of containerboard include single face corrugated fibreboard, single-wall corrugated fibreboard, double-wall corrugated fibreboard, triple-wall corrugated fibreboard and corrugated fibreboard with more walls. The foregoing are examples of cellulose based substrate and forms the cellulose based substrate may take that are useful in accordance with the methods of the present invention; however, the present invention is not limited to the foregoing forms of cellulose based substrates.

Portions of the cellulose based substrate can be crushed before applying the films. Crushing of the cellulose based substrate adjacent the peripheral edges and the edges within cutouts and slots has been observed to result in improved conformance of the films to the shape of the edges. Crushing of the edges can be achieved by passing the edges through a nip to temporarily reduce the caliper of the substrate and reduce its resilience to deformation. Crushing of the edges is commonly achieved by placing stiff rubber rollers adjacent to the cutting knives.

Polymeric films useful in accordance with the present invention include thermobondable films that are moisture-resistant, preferably moisture impervious. Such films are generally multi-layer films, e.g., a two or more layer film. With multi-layer films, the layers preferably have different melting points, with the layer of film adjacent to the containerboard blank having a melting point that is lower than the melting point of the layer that is not directly adjacent to the containerboard blank. For example, a two-layer film wherein the layers have a melting point difference of at least 14° C.-17° C. (25° F.-30° F.) are useful. One useful polymeric film is a co-extruded film having an outer layer of linear low density polyethylene with a melting point of about 130° C. (266° F.) and an inner ethylene vinyl acetate bonding layer with a melting point of about 80° C. (176° F.). Other examples of suitable polymeric films include co-extruded films that include layers of linear low density polyethylene-low density polyethylene, ethylene acrylic acid, and ethylene methacrylic acid. Films that include layers of metallocene, Surlyn® thermoplastic resins from DuPont Company, polypropylene, polyvinylchloride, or polyesters or combinations thereof are other examples of polymeric films.

The choice of a specific film composition and structure will depend on the ultimate needs of the particular application for the cellulose based substrate. Films should be chosen so that they provide the proper balance between properties such as flexibility, moisture-resistance, abrasion-resistance, tear-resistance, slip-resistance, color, printability and toughness.

Film thickness can vary over a wide range. The film should not be so thick that when it is applied to a container blank and heated it will not conform to changes in topography along the surface of the container blank created by such things as the peripheral edges, edges defined by the slots, and edges defined by the cutouts. The films should be thick enough to survive normal use conditions without losing their moisture resistance. Exemplary film thicknesses range from about 0.7 mil (0.018 mm) to about 4.0 mil (0.10 mm).

The polymeric film applied to the inner and outer surfaces of the container blank can be the same, or different films can be applied to different surfaces. Choosing different films for the respective surfaces would be desirable when the particular properties needed for the respective surfaces of the container blank differ. Examples of film properties that might be chosen to be different on the respective surfaces of the container blank include those film properties discussed above. It is possible that graphics may be preprinted on the moisture-resistant film. For food applications, the film is preferably approved for use by the United States Food and Drug Administration.

While the foregoing description of an encapsulated container blank has been provided in the context of an entire container blank, as noted above, it is understood that inner packings for a container such as shells, tubes, U-boards, H-boards or corner boards can be encapsulated using the methods of the present invention prior to being formed into their supporting structure.

Figure 6:
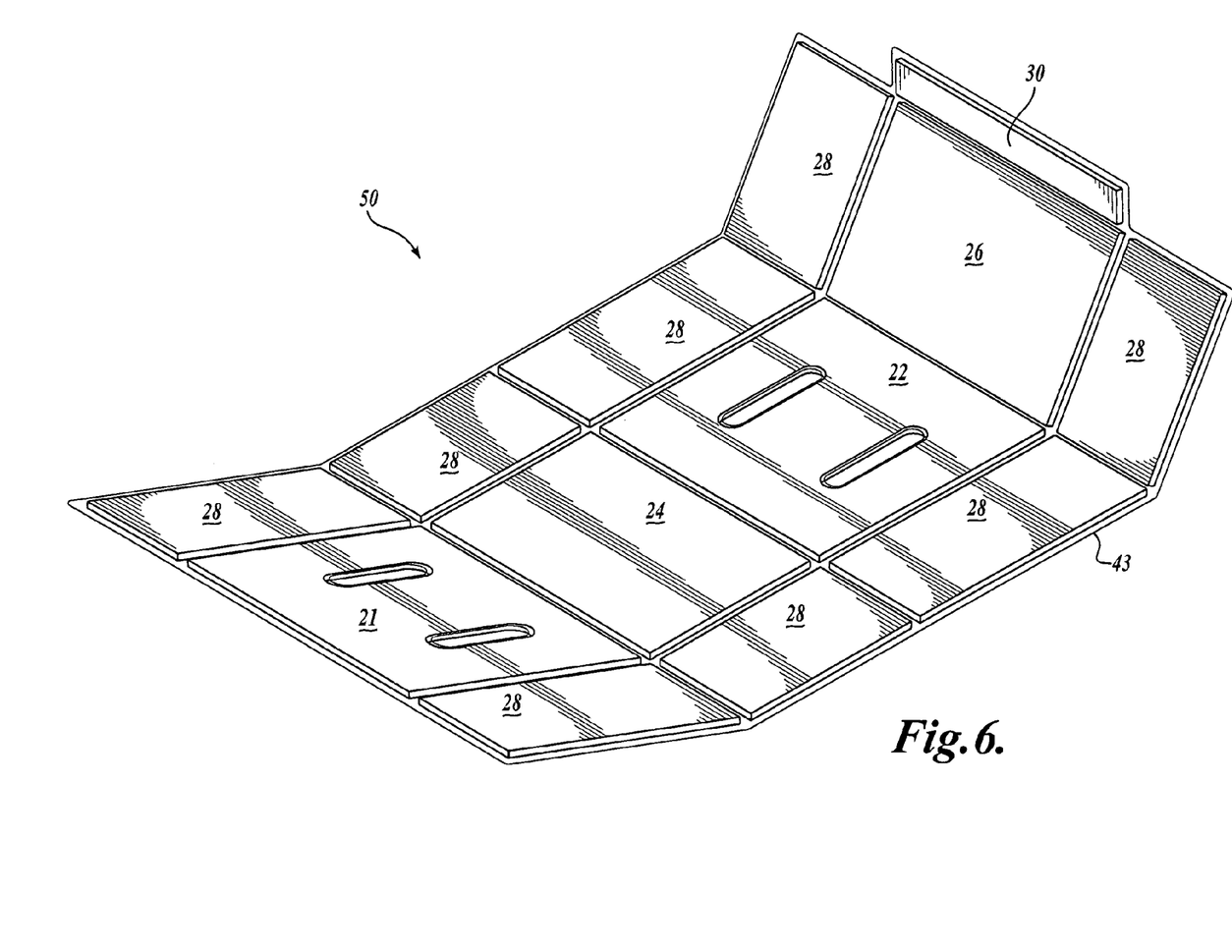
FIG. 6 is a perspective view of one surface of a second embodiment of a container blank encapsulated with polymeric films by a method carried out in accordance with the present invention.

Referring to FIG. 6, the methods of the present invention can produce a container blank 50 wherein panels 21, 22, 24, and 26 are structurally separated from each other as well as from flaps 28 and flap 30. In this embodiment, polymeric films 43 function as a hinge between the respective panels of the container blank.

Figure 7:
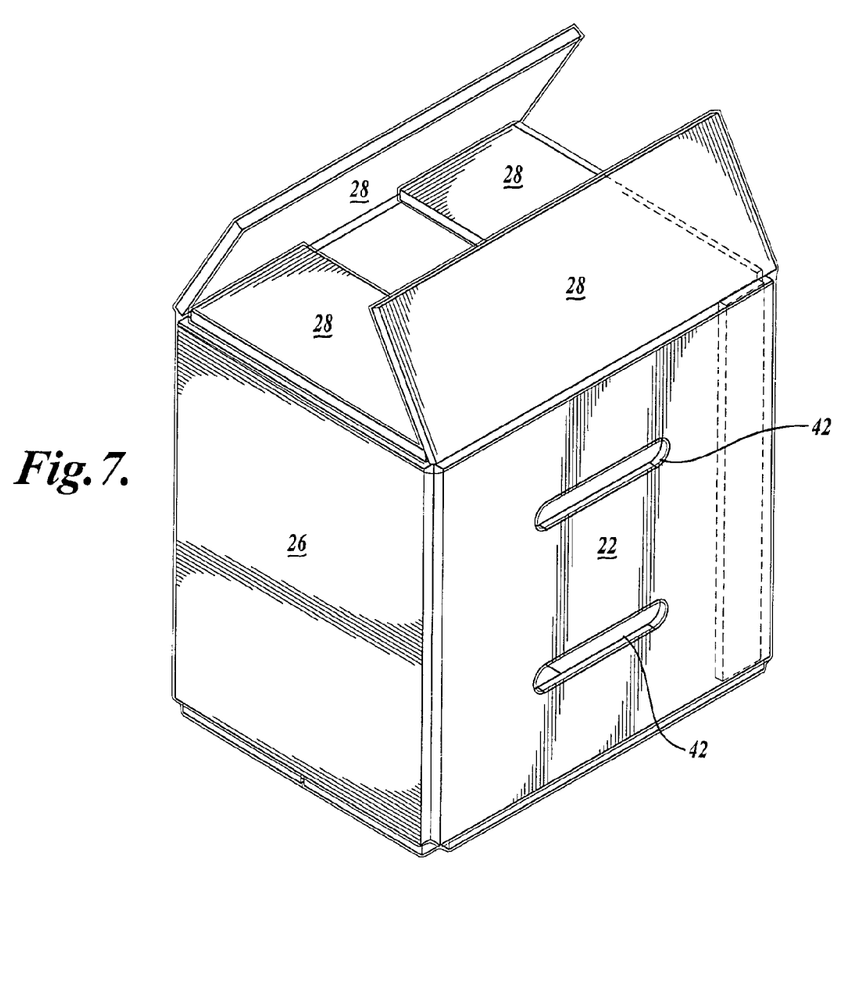
FIG. 7 is a perspective view of a container formed from the container blank of FIG. 6.

Container blank 50 can be folded and secured to form a container as shown in FIG. 7. The numbering convention of FIG. 6 has been carried forward into FIG. 7.

Figure 8:
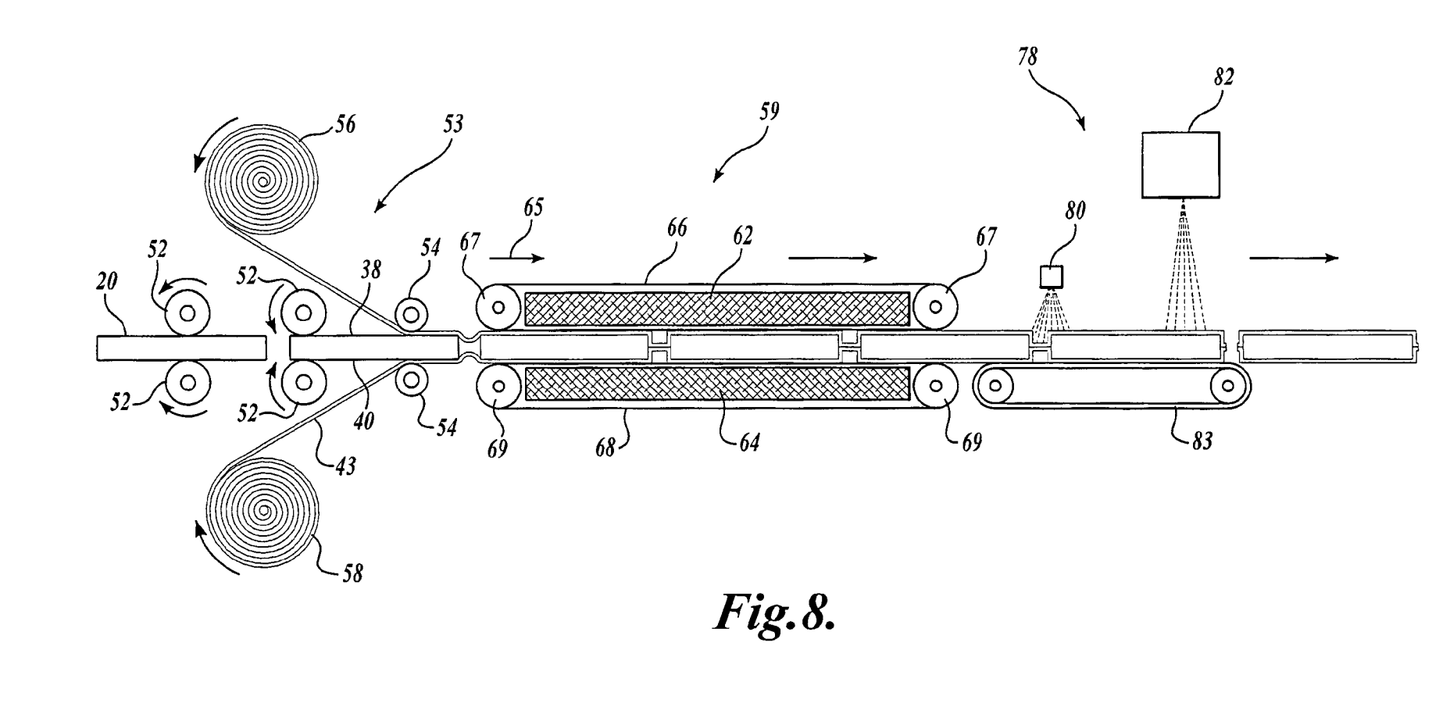
FIG. 8 is a diagrammatic view of a process for encapsulating a container blank with polymeric films in accordance with the present invention.

Referring to FIG. 8, a method carried out in accordance with the present invention for producing a cellulose based substrate encapsulated in a polymeric film on a continuous basis, as opposed to a batch basis is illustrated and described in the context of a containerboard blank. A container blank 20 from a source of container blanks (not shown) is delivered via a conveyance system illustrated as two sets of rollers 52 to a film application stage 53. At film application station 53, film delivery rollers 54 receive polymeric film from a first source of film 56 and a second source of film 58. Film 56 is provided adjacent upper first surface 38 of container blank 20, and film 58 is provided adjacent lower second surface 40 of container blank 20. Films 56 and 58 have a width measured in the cross-machine direction that is greater than the width of the container blank. Thus, portions of the films overlap adjacent the container blank periphery. The combination of container blank 20, first film 56 and second film 58 is delivered from film application stage 53 to a heating stage 59. In the embodiment of FIG. 8, heating stage 59 includes a conveyance system for continuing to support and move the blanks and film in the direction of arrow 65. In the illustrated embodiment, the conveyance system includes an upper conveyor belt 66 and a lower conveyor belt 68 that are spaced apart in the vertical direction. Conveyor belt 66 is driven by rollers 67, and conveyor belt 68 is driven by rollers 69. Conveyor belts 66 and 68 include nonstick surfaces to prevent adhesion between the conveyor belt and films 56 and 58. Teflon® coated belts are one example of suitable nonstick surfaces. Associated with upper conveyor belt 66 is an upper heating platen 62 for delivering thermal energy from the upper platen through conveyor belt 66 to film 56 adjacent upper surface 38 of container blank 20. In a similar manner, a lower heating platen 64 is associated with lower belt 68 for providing thermal energy to film 58. Upper platen 62 and lower platen 64 heat the films 56 and 58 by conduction through conveyor belts 66 and 68. In this manner, the temperature of films 56 and 58 are increased to the point where a portion of films 56 and 58 adjacent container blank 20 become tacky and are capable of adhering to the upper surface 38 and lower surface 40 of container 20 as well as to each other, as explained below in more detail. The combination of the respective heating platens and conveyor belts are configured so that a substantial portion, preferably the entire portion, of films 56 and 58 that are adjacent upper surface 38 and lower surface 40 are heated in order to promote adhesion of films 43 over the entire upper and lower surface of the container blank.

Upper heating platen 62 and lower heating platen 64 are examples of a non-electromagnetic radiation heating source suitable for increasing the temperature of the films. Non-electromagnetic radiation heating sources include energy sources that rely upon energy other than electromagnetic radiation to increase the film temperature. Heating platens 62 and 64 are examples of conductive heat sources such as a resistive heater. Another example of a non-electromagnetic radiation heating source includes devices capable of heating the films by convection.

As noted above, films 56 and 58 are dimensioned such that the respective films extend beyond the container blank periphery in the cross machine direction. In this manner, film 56 can come into contact with film 58 adjacent the container blank periphery where the films overlap. In addition, film 56 and film 58 will overlap in any gaps caused by slots and cutouts formed within the blank. As the temperature of the films increases and the films become tacky, the films begin to adhere to the blank and to each other around the periphery and in the slots and the cutouts to form an envelope-like structure encapsulating the container blank.

While the films are in this tacky state, they will adhere to each other at substantially all points where they overlap. In this manner, the films form an envelope that substantially encapsulates the container blank. As described below in more detail, the envelope is formed in such a manner that a pressure differential can be provided between the environment inside the envelope and the environment outside the envelope. An envelope formed around the container blanks is suitable so long as it encapsulates the blank in a manner that is capable of supporting a pressure differential between the inside of the envelope and the outside. For example, two films sealed to each other adjacent the leading and trailing edges of a container blank, but not the parallel side edges would not substantially encapsulate a blank so as to be suitable for supporting a pressure differential between an environment between the films and an environment outside the films; however, an envelope formed by the films wherein the films form intermittent or reversible bonds around all exposed edges would be satisfactory, because a pressure differential can be created between the interior of the envelope and the environment exterior to the envelope.

Conformation of the two films to the container blank periphery, slots, and cutouts, by films 56 and 58 is promoted by providing the pressure differential between an environment within the envelope described above and the environment exterior of such envelope. More specifically, a container blank and films are treated so that there is a point in the manufacturing process after the films form an envelope around the blank where the pressure within the envelope is lower than the pressure exterior to the envelope. Satisfactory conformance of the films is evidenced by an absence of air bubbles at the interface between the films and the container blank, as well as robust and continuous seals around all of the exposed edges of the container and the edges exposed within the cutouts and slots. The degree of the conformance of the films to the container blank can be evaluated by assessing the distance between the film-to-film bond line and the exposed edge of the container blank. As the distance between the film-to-film bond line and the container blank edge increases, the degree of conformance of the film to the container blank edge decreases. Shorter distances between the container blank edge and the film-to-film bond line are more desirable than larger distances.

As used herein, the phrase "pressure differential" refers to a difference in pressure between the inside of the envelope and the exterior of the envelope that is attributable to more than the pressure differential that would be observed by simply reducing the temperature of gas within the envelope without a phase change. For example, in the context of the present invention, a pressure differential can be provided by moving the envelope from a low pressure environment to a higher pressure environment, with or without cooling of the gas within the envelope.

In one embodiment, the pressure differential is provided by forming steam within the envelope which displaces air out of the envelope through unsealed, overlapping portions of the films or by forcing open lightly sealed overlapping portions of the films. As the envelope leaves heating stage 59, it begins to cool, and steam within the envelope condenses resulting in a pressure reduction within the envelope. A pressure differential then results from the difference between the pressure within the envelope and atmospheric pressure found outside the heating stage. Condensation of the steam should occur after the films are bonded to each other sufficiently that gas cannot pass through the film-to-film seals and into the envelope.

As a result of the tackiness of the films and the overlap between the films, gas can escape the envelope, however, gas external to the interior of the envelope is not able to enter the envelope. As the pressure differential promotes film conformance, the films come in further contact with each other around all the exposed edges. As the temperature of the film begins to fall, the films stronger bonds to each other and form moisture-resistant seals at all points where the films overlap.

Steam can be produced from moisture present in the container blank using the thermal energy provided to the blanks from the non-electromagnetic radiation heating source. Alternatively, other sources of energy can be used to generate the steam from moisture within the container blanks such as sources of electromagnetic radiation in the form of infrared waves, microwaves or radio frequency. The steam can be generated in the heating stage or it can be generated immediately after the heating stage.

Figure 9:
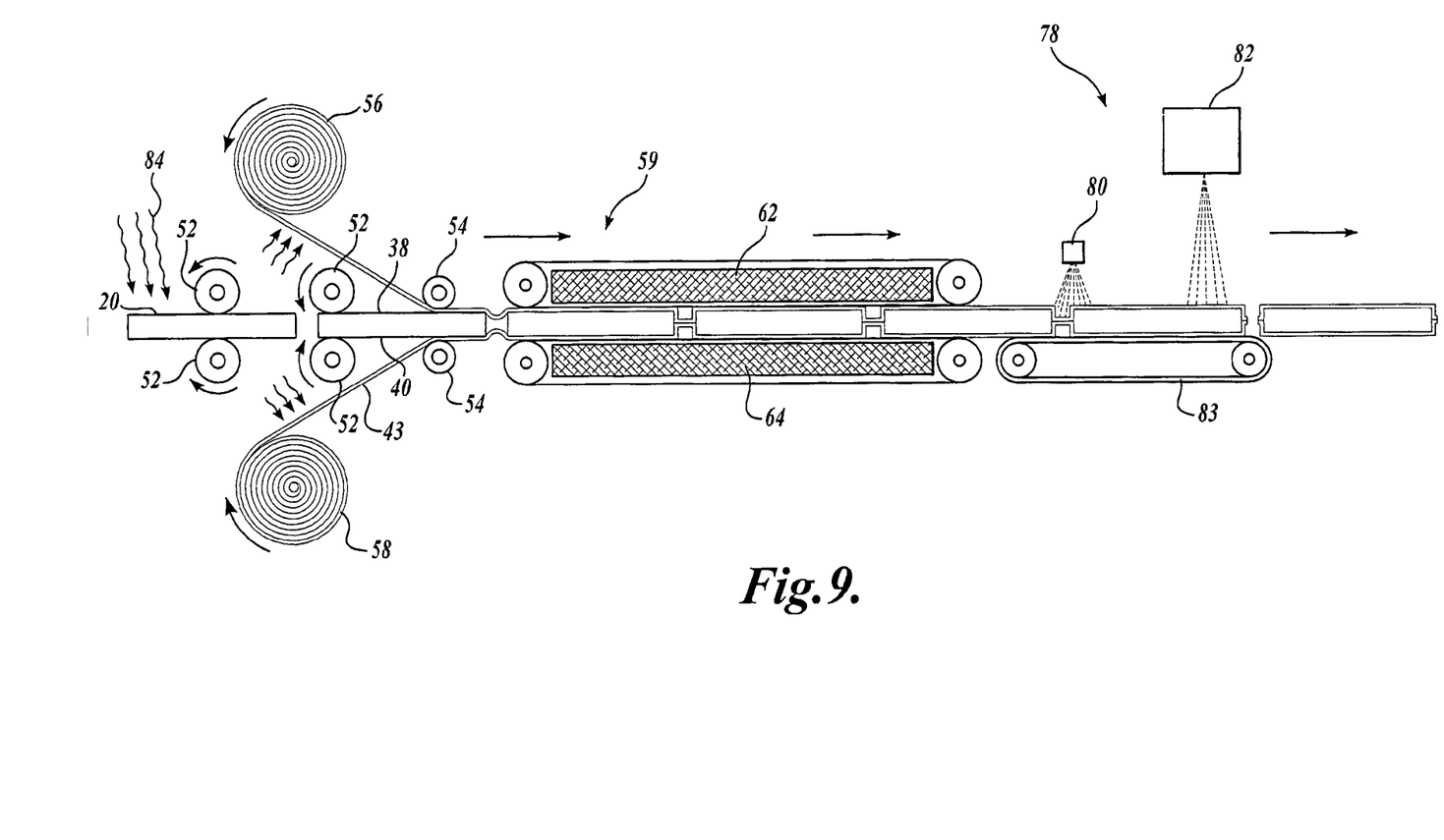
FIG. 9 is a diagrammatic view of a second embodiment of a process for encapsulating a container blank with polymeric films in accordance with the present invention.

Another alternative would be to heat the container blanks sufficiently to generate steam immediately prior to their coming into contact with the polymeric films, in effect, trapping the steam between the applied films 56 and 58. This embodiment is depicted in FIG. 9 wherein electromagnetic radiation 84 is directed at container blank 20 prior to application of films 56 and 58. When steam is to be generated in this manner, the electromagnetic radiation 84 should be directed towards the container at a location close enough to the location where the films are applied to the container so as to capture steam within the envelope formed by the films. FIG. 9 also illustrates an alternative embodiment wherein films 56 and 58 are preheated prior to their application to container 20. Preheating can be achieved by directing electromagnetic radiation toward the films or by providing other energy sources for increasing the temperature of the films before treatment in heating stage 59.

Figure 4:
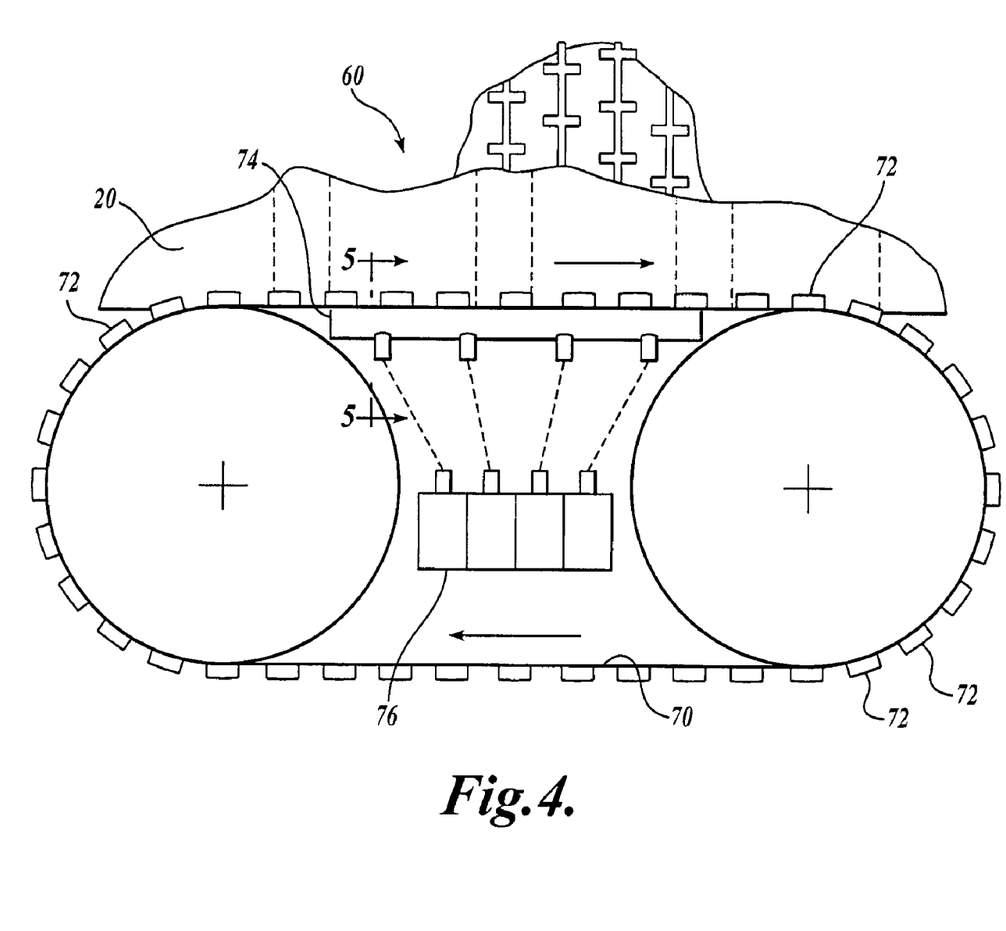
FIG. 4 is a top schematic view of a nozzle arrangement for creating a pressure differential between an environment within an envelope formed by a first polymeric film and a second polymeric film and an environment outside the envelope in accordance with the present invention.
Figure 5:
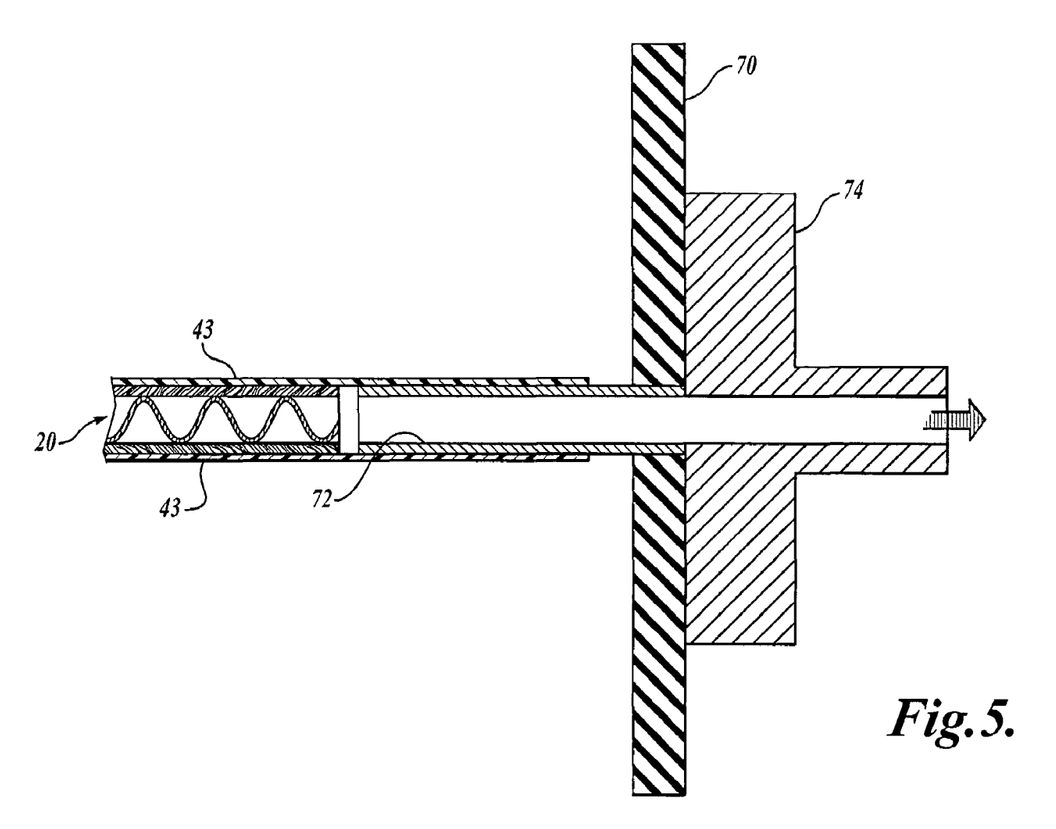
FIG. 5 is a sectional view taken along line 5-5 in FIG. 4.

Referring to FIGS. 4 and 5, another alternative for reducing the pressure within the envelope defined by the two films around the blanks employs a rotating belt 70 that carries a plurality of nozzles 72. Belt 70 travels at the same speed that the container blanks 20 and films 56 and 58 travel through heating stage 59. A manifold 74 that is in fluid communication with vacuum pumps 76 is present between the rollers that drive belt 70. Within heating stage 59, one end of nozzle 72 engages the manifold. The opposite end of the nozzle 72 is positioned between the polymeric films 56 and 58. Nozzles 72 are interposed between the two films so that they are in fluid communication with the interior of the envelope formed around the blank. Operation of the vacuum pumps draws air out of the envelope through the nozzles, thus reducing the pressure within the envelope. As described above, the pressure differential between the inside of the envelope and the exterior of the envelope promotes the conformance of the film to the unsealed edges of the container blank found around the container blank periphery and within the slots and cutouts.

Upon exiting heating stage 59, the films 56 and 58 continue to conform to the container blank and will begin to cool causing the films to form the moisture-resistant seals described above. Cooling of the blank and film should be carried out as soon as possible after the container blank and films exit heating stage 59 in order to make the film-to-film seal permanent. In order to increase the rate of cooling, external cooling means such as fans can be provided. After the films and container blank have cooled sufficiently to form the moisture-resistant seals, the combination is delivered to a trimming stage 78 where cooperation between a sensor 80 and a laser 82 serves to trim away excess polymeric film around the container blank periphery and within the slots and cutouts without compromising the moisture-resistant seals.

In order to ensure the accuracy of the film trimming, trimming stage 78 preferably employs a conveyance system 83 that minimizes movement of the container blank and films during the laser trimming process. Trimming of excess film can also be achieved by other means, such as die cutting or hand trimming. When laser trimming is employed, a benefit in addition to removing unwanted film includes further sealing of the films at locations where the laser is applied. This further sealing results from the laser heating the films in order to trim away unwanted portions.

By trimming away portions of the polymeric films within the cutouts, openings can be provided for ventilation, drainage, or for allowing the cutouts to serve as handles for the container.

Although not illustrated, other methods of promoting the conformance of the polymeric films to the container blank can be used. One example of such method includes a hot air knife capable of delivering a focused stream of air at the encapsulated container blank.

Figure 10:
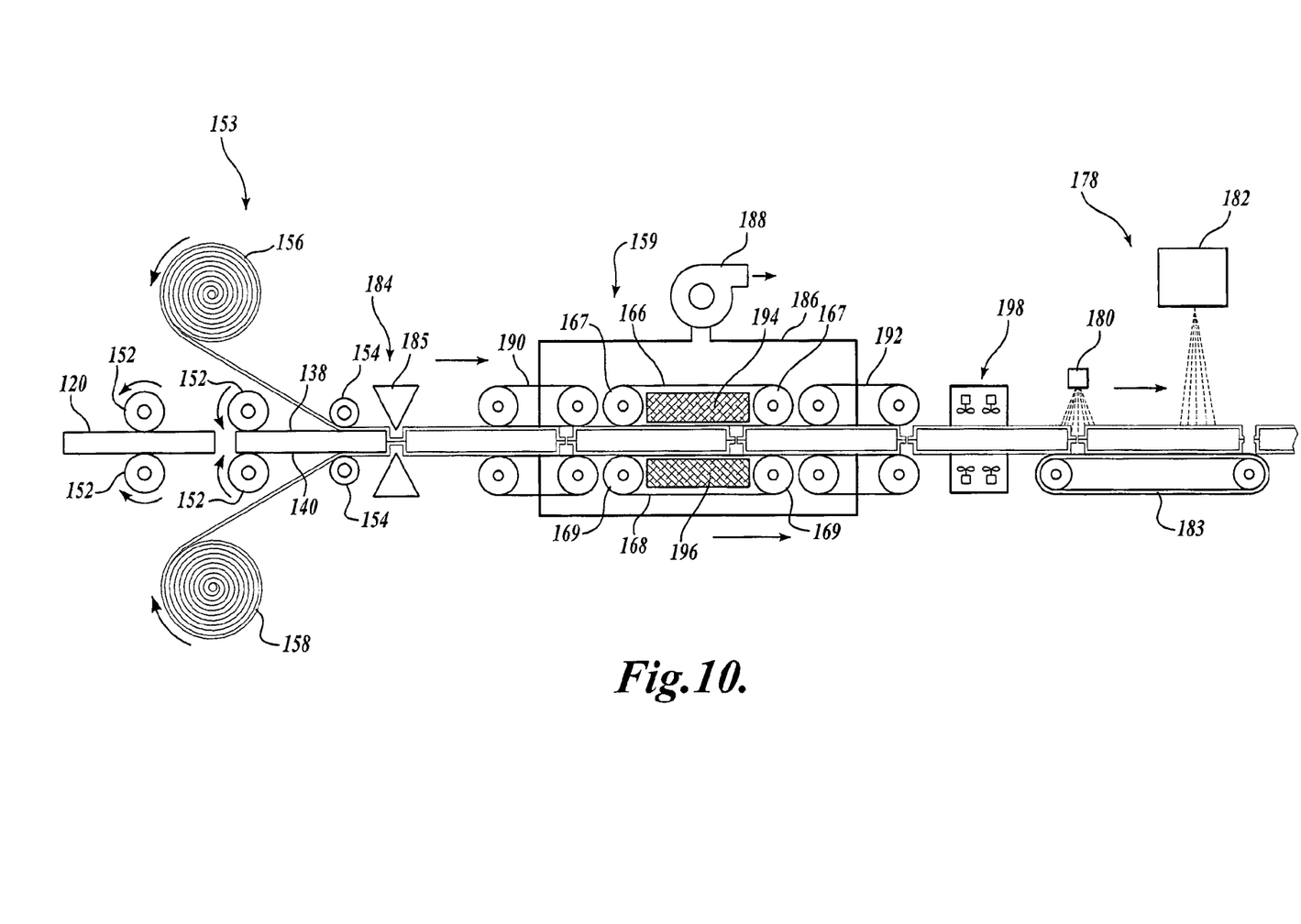
FIG. 10 is a diagrammatic view of a third embodiment of a process for encapsulating a container blank with polymeric films in accordance with the present invention.

In another embodiment of producing a cellulose based substrate encapsulated in a polymeric film illustrated in FIG. 10, a container blank 120 from a source of container blanks (not shown) is delivered via a conveyance system illustrated as two sets of rollers 152 to a film application stage 153. In film application stage 153, film delivery rollers 154 receive a polymeric film from a first source of film 156 and a second source of film 158. Film 156 is provided adjacent upper first surface 138 of container blank 120 and film 158 is provided adjacent lower second surface 140 of container blank 120. The width of films 156 and 158 measured in a direction transverse to the direction the container blanks 120 travel is greater than the width of the blanks. Thus, portions of films 156 and 158 extend beyond the edges of the blanks that are parallel to the direction that the blank travels. In the direction that the blanks travel through the process, individual blanks are spaced apart. Films 156 and 158 bridge the space between the trailing edge of one blank and the leading edge of the next blank. The web comprising container blank 120 and films 156 and 158 are delivered from film application stage 153 to sealing stage 184. Sealing stage 184 includes apparatus for providing a moisture-resistance seal between films 156 and 158 in the space between the trailing edge of one blank and the leading edge of the next blank. Suitable means for providing such seal include a bar sealer 185 or equivalent equipment. When bar sealer 185 is used, it seals the films to each other and also severs the film that extends between two consecutive blanks.

At the time the web leaves sealing stage 184, overlapping portions of films 156 and 158 adjacent side edges parallel to the direction of travel of the container blank are not sealed in this embodiment. In other embodiments, the films can be sealed to each other around three edges of the container in the sealing stage. Even a portion of the fourth edge can be sealed, provided that gas within the envelope can escape, and the pressure within the envelope can approach the vacuum in the vacuum chamber as described below in more detail.

From sealing stage 184, blank 120, sleeve wrapped with the overlapping films 156 and 158, is delivered to heating stage 159. In the embodiment of FIG. 10, heating stage 159 includes vacuum chamber 186. Vacuum chamber 186 is an airtight vessel in fluid communication with vacuum pump 188. Vacuum chamber 186 includes an inlet provided with an inlet airlock 190. Inlet airlock 190 permits the combination of container blank 120, first film 156 and second film 158 to enter vacuum chamber 186 without compromising the vacuum created within vacuum chamber 186. Vacuum chamber 186 also includes an outlet provided with an outlet airlock 192 that is configured to allow the combination of container blank 120, first film 156 and second film 158 to exit vacuum chamber 186 without compromising the vacuum created within vacuum chamber 186. Other systems besides airlocks for providing an airtight seal at the inlet and outlet of chamber 186 can be used. Vacuum chamber 186 also includes a conveyance system for moving and supporting the container blanks 120 and films 156 and 158 through vacuum chamber 186. In the illustrated embodiment, the conveyance system comprises an upper conveyor belt 166 and a lower conveyor belt 168 that are spaced apart in the vertical direction. Conveyor belt 166 is driven by roller 67, and conveyor belt 168 is driven by rollers 169. Conveyor belts 166 and 168 include nonstick surfaces to prevent adhesion between the conveyor belt and films 156 and 158. Preferably, conveyor belts comprise an open mesh belt or a plurality of spaced apart parallel belts. Teflon® coated belts are one example of suitable nonstick surfaces.

Within vacuum chamber 186 is an upper non-electromagnetic radiation heating source 194 positioned above container blanks 120 and films 156 and 158. Also, within vacuum chamber 186 is a lower non-electromagnetic radiation heating source 196 positioned below the container blank and films. Upper non-electromagnetic radiation heating source 194 and lower non-electromagnetic radiation heating source 196 provide energy necessary to increase the temperatures of films 156 and 158. Examples of suitable non-electromagnetic radiation heating sources have been described above.

In accordance with this embodiment of the present invention, container blank 120 and films 156 and 158 from sealing stage 184 enter vacuum chamber 186 through inlet airlock 190. Pressure in vacuum chamber 186 is less than atmospheric. Once present within the vacuum chamber, air within the sleeve wrapped container blank, e.g., within the corrugated portion of the blank as well as air between the blank and films is at least partially evacuated, thus reducing the pressure within the envelope formed by films 56 and 58. As the combination of container blank and films passes through vacuum chamber 186 and between the non-electromagnetic radiation heating sources, the temperature of the films 156 and 158 is increased, including those portions that extend beyond the periphery of the blank, so that they soften, become tacky, and capable of adhering to each other and the surfaces of the container blank 120.

As noted above, as the temperature of the films increases, they become tacky. This tackiness allows the films to begin to adhere to each other. In addition, the films begin to adhere to the container blank. The adhesion that occurs when the films are tacky is not as strong as the adhesion between the films that occurs once the films have been cooled to substantially below the temperature at which the films become tacky, such as room temperature.

Once the films have been heated as described above and the pressure within the envelope formed by the films around the blank has been reduced, the combination exits vacuum chamber 186 through outlet airlock 192 where it is exposed to an increased pressure environment, e.g., atmospheric pressure.

The pressure differential that exists between the environment within the envelope formed by films 156 and 158 and the environment outside the envelope promotes the conformation of films 156 and 158 to the periphery of container blank 120, as well as to any edges defined within slots and cutouts provided in blank 120. As discussed above, conformance of the films to the peripheral edges of the container, as well as edges defined within slots and cutouts, can be further promoted through the generation of steam and subsequent condensation thereof within the envelope formed by films 156 and 158 around container blank 120. As described above, steam can be formed within the envelope by increasing the temperature of the container blank to above a temperature needed to convert moisture in the blank to steam. The steam displaces air out of the envelope through unsealed, overlapping portions of the films. Alternatively, if there are no portions of the overlapping films which have not come into contact with each other, air can be displaced through those portions of the overlapping films that are adhered less strongly to each other than other areas. When the envelope leaves vacuum chamber 186 and is cooled as described below in more detail, steam within the envelope condenses.

Encapsulated blanks exiting the vacuum chamber are received into cooling stage 198. Cooling stage 198 includes equipment for reducing the temperature of the films. In the illustrated embodiment of FIG. 10, cooling stage 198 includes a plurality of fans for reducing the temperature of the films. It should be understood that other conventional systems for reducing the temperature of the films can also be used. Cooling of the blank and films should be carried out as soon as possible after the container blank and films exit the outlet airlock in order to make the film-to-film seals permanent.

From cooling stage 198, the blanks and adhered films are delivered to trimming stations 78 where unwanted portions of the films are removed as described above.

The present invention has been described above in the context of a containerboard blank encapsulated with a polymeric film. The containerboard blank can be formed and secured to provide a moisture-resistant container. In addition, such a moisture-resistant container can be combined with other structural components such as inner packings, described above, that may be encapsulated with a polymeric film, or may not be encapsulated with a polymeric film. Furthermore, containers can be provided wherein the container body is not encapsulated with a polymeric film while certain inner packing structural components are encapsulated with a polymeric film. In addition, cellulose based inner packings encapsulated with a polymeric film can be combined with non-cellulosic based container bodies and cellulose based container bodies encapsulated with polymeric film can be combined with non-cellulosic inner packing structural components.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for encapsulating a cellulose based substrate with a polymeric film, the method comprising:
   providing a cellulose based substrate, the cellulose based substrate having a first surface, a second surface opposite the first surface, and a cellulose based substrate periphery;
   providing a first polymeric film adjacent the first surface and extending beyond the cellulose based substrate periphery;
   providing a second polymeric film adjacent the second surface and extending beyond the cellulose based substrate periphery, the first film and second film defining an envelope that substantially encapsulates the cellulose based substrate;
   increasing the temperature of the first polymeric film adjacent the first surface and the second polymeric film adjacent the second surface using a non-electromagnetic radiation heating source such that steam is generated within the envelope;
   providing a pressure differential between an environment within the envelope and an environment outside the envelope; and
   bonding the first polymeric film to the second polymeric film adjacent the cellulose based substrate periphery.

2. The method of claim 1, wherein the step of providing a pressure differential comprises condensing the steam generated within the envelope.

3. The method of claim 1, wherein the polymeric film is moisture resistant.

4. The method of claim 1, wherein the cellulose based substrate includes cut-outs and slots.

5. The method of claim 4, further comprising bonding the first polymeric film to the second polymeric film adjacent the cutouts or slots.

6. The method of claim 1, wherein the cellulose based substrate comprises container inner packings for a container selected from U-boards, H-boards and corner boards.

7. The method of claim 1, wherein the first polymeric film and second polymeric film comprise identical structures and compositions.

8. The method of claim 1, wherein the first polymeric film and second polymeric film are different in structure.

9. The method of claim 1, wherein the first polymeric film and the second polymeric film are different in composition.

10. The method of claim 1, further comprising the step of trimming the first polymeric film and/or the second polymeric film after the bonding step.

11. The method of claim 10, wherein the step of trimming is carried out using a laser.

12. The method of claim 1, further comprising the step of heating at least the first or second polymeric film before the step of providing the respective polymeric film adjacent the respective first or second surface of the cellulose based substrate.

13. The method of claim 1, further comprising reducing the resilience of a portion of the cellulose based substrate adjacent the cellulose based substrate periphery.

14. The method of claim 1, wherein the step of providing a pressure differential comprises subjecting the envelope to a first pressure environment followed by a second pressure environment, pressure in the first pressure environment being less than pressure in the second pressure environment.

* * * * *